Aug. 8, 1961  C. BOSCH  2,995,751
MULTIVIBRATOR R.D.F. ADAPTER
Filed July 20, 1959
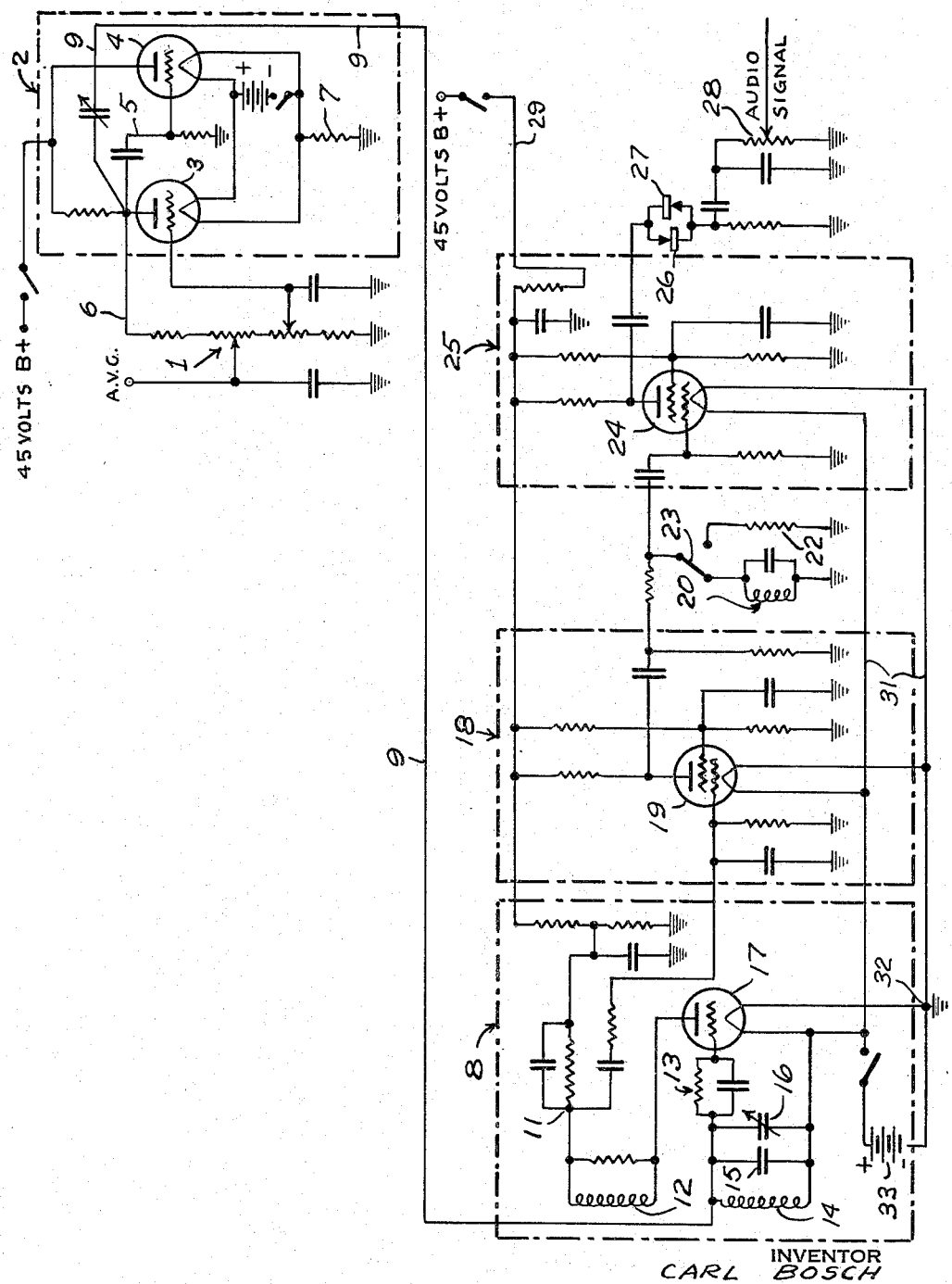
INVENTOR
CARL BOSCH
BY
Borstaus Borst
ATTORNEYS

United States Patent Office 2,995,751
Patented Aug. 8, 1961

2,995,751
MULTIVIBRATOR R.D.F. ADAPTER
Carl Bosch, Larchmont, N.Y., assignor to Sperry Rand Corporation, Ford Instrument Company Division, Wilmington, Del., a corporation of Delaware
Filed July 20, 1959, Ser. No. 828,410
5 Claims. (Cl. 343—113)

This invention relates, in general, to radio direction finders and more particularly to portable radio direction finders utilized by small aircraft and ships to take bearings of a radio beacon.

In a conventional radio direction finder the bearing of a radio beacon is found by turning the antenna affixed to the radio direction finder to a null position where the resultant beacon signal is minimum. Since the signal received at the null position is at a minimum, the inherent signal to noise ratio is a minimum and, therefore, considerable inaccuracies would result in determining the bearing of the radio beacon.

It is therefore an object of the invention to provide improved means for determining the bearing of a radio beacon.

Another object of the invention is to provide an audio means for determining the bearing of a radio beacon.

To these ends the invention contemplates the use of a multivibrator adapter in conjunction with a radio direction finder to determine the line of sight to a beacon by detecting either the minimum beacon signal or by the use of two identical beacon signal intensities occurring at equiangular distances from the line of sight.

Generally the adapter employs a multivibrator which receives the beacon signal as a D.C. voltage, commonly called the automatic volume control (A.V.C.), from a detector within the radio direction finder (not shown). This voltage which is proportional to the beacon signal changes the multivibrator frequency in accordance with the signal strength. There are means provided to beat the multivibrator output to produce an audio frequency corresponding to the signal voltage applied to the grid of the multivibrator. The zero beat condition is manually adjustable and can be made to occur at any arbitrary signal voltage, preferably at the null position or at equiangular signal positions. In addition the adapter includes a tuned audio circuit which produces an output signal only at a discrete predetermined pitch, preferably in the midaudio range, which signal can be used in place of the zero beat condition.

When the antenna of the direction finder is slowly turned from a minimum toward a maximum, the frequency of the multivibrator changes accordingly. By employing either the zero beat condition or the single tone condition described above, the operator can precisely determine two points on either side of the line of sight to the beacon. Alternately, the position of minimum signal strength (null) may be determined.

The invention has other objects and advantages which will appear from the following description of a particular embodiment of the invention in conjunction with the accompanying drawing, in which the figure shows a schematic representation of a particular circuit arrangement of the multivibrator R.D.F. adapter.

With reference to the drawing the A.V.C. signal from the radio direction finder is fed to a network 1 which is associated with a multivibrator 2. The multivibrator 2 has a triode 3 and a triode 4 cathode coupled by a resistor 7. The filaments of the tubes, as are all the tubes in the adapter circuit, being battery excited to reduce hum. A capacitive-resistance lead 5 couples the plate of the triode 3 to the grid of the triode 4 and together with a common cathode resistor 7 causes the multivibrator to produce harmonic frequency oscillations according to the level of the incoming signal. The direction of the frequency shift of the multivibrator is related to the applied signal so that the higher the applied voltage, the greater the frequency shift of the multivibrator from its natural frequency. A feedback lead 6 from the plate of the triode 3 to the network 1 serves to compensate partially for any change in B+ voltage and in tube characteristics.

A regenerative detector 8 receives the multivibrator output on lead 9 and is provided with an oscillator section comprising an inductor 14, a capacitor 15 and a variable capacitor 16 which is connected across the grid and cathode of a triode 17. Interposed on lead 9 between the grid of triode 17 and the oscillator section is an RC network 13. The plate lead of the triode 17 includes an RC network 11 and a plate winding 12. The regenerative detector operates as an oscillator selectively tuned to, say, the 10th harmonic of the normal oscillator frequency and adjusted to zero beat therewith to produce an audio signal. The regenerative detector is set to oscillate in the neighborhood of 1 mc. An important feature of this arrangement is the fact that the multivibrator frequency shift is multiplied by 10 for these conditions and results in a factor of 10 in the overall sensitivity of the system.

The audio beat frequency is placed on the control grid of vacuum tube 19 which is disposed in a conventional voltage amplification circuit 18. The amplified frequency is then fed across the LC circuit 20 or resistor 22 depending on the position of switch 23 which is connected to the amplifier output. The LC circuit 20 is sharply tuned to a preselected frequency and will respond only to this frequency. Accordingly, a tone will be passed to the succeeding audio components when the 10th harmonic of the multivibrator frequency reaches a precise value. Of course, if the regenerative detector is set to zero heat on each side of minimum, the resistor 22 is placed in the circuit and the voltage developed across it is placed in the succeeding component.

Tube 24 of voltage amplifier circuit 25 receives the output of the LC circuit 20 or the resistor 22, depending on the mode of operation, and there is disposed in its plate lead a pair of half wave diodes 26 and 27 which combine to eliminate signals of less than a given amplitude. This action of the diodes prevents stray signals which pass through the filter or which are induced therein as small "ringing" signals from being heard. The audio signal developed across potentiometer 28 is made available at its tap for further amplification either in the radio direction finder or any other suitable means for producing an audible tone.

As explained above, the tube filaments of the adapter are preferably battery excited, the filaments of tubes 17, 19 and 24, for example, being shown connected across battery line 31. A ground connection 32 and a battery 33 have such polarity as to establish a partial cathode bias for tubes 19 and 24. The plates of the tubes are supplied by the B+ line 29 which also serves to bias the screen grids of these tubes.

Various departures from the specific embodiment of invention above described may be devised by persons skilled in the art without avoiding the principle and scope of invention as defined in the appended claims.

What is claimed is:
1. An adapter for a radio direction finder comprising a signal receiving means, a multivibrator connected to said receiving means and adapted to be frequency shifted in accordance with a D.C. voltage from said receiving means, means for generating a beat frequency derived from a selected output frequency of said multivibrator, a network circuit, means for selectively connecting said network circuit to the output of said beat frequency gen- erating means whereby said network can filter or pass through signals from said generating means, an audio clipping circuit and amplifying means connected between said clipping circuit and said network circuit.

2. An adapter for a radio direction finder comprising a multivibrator, a means for receiving a D.C. voltage signal which is proportional to a beacon signal and applying it to said multivibrator, said multivibrator being adapted to have its frequency change in accordance with said signal strength, a regenerative detector connected to receive the output of said multivibrator and beat said output to produce an audio frequency corresponding to said voltage signal, a network circuit which is selectively connected to the output of said regenerative detector whereby said network can filter or pass through said audio frequencies, a voltage amplifier means connected between said regenerative detector and said network circuit, an audio clipping circuit adapted for producing an output signal which is above a predetermined amplitude and amplifying means connected between said clipping circuit and said network circuit.

3. An adapter for a radio direction finder as set forth in claim 2 wherein the means for receiving said D.C. voltage signal is adjustable so that the zero beat condition can be made to occur at any arbitrary signal voltage.

4. An adapter for a radio direction finder as set forth in claim 3 wherein said network circuit consists of an LC network which is tuned to a preselected frequency, a resistor and a switch which selectively interposes either the network circuit or the resistor into the output of said voltage amplifier.

5. An adapter for a radio direction finder as set forth in claim 4 wherein said audio clipping circuit is a pair of half wave diodes connected in parallel and oppositely poled whereby signals of less than a given amplitude are eliminated.

No references cited.